(12) United States Patent  
Fan

(10) Patent No.: US 8,159,720 B2  
(45) Date of Patent: Apr. 17, 2012

(54) COLOR ERROR DIFFUSION

(75) Inventor: Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1761 days.

(21) Appl. No.: 11/101,869

(22) Filed: Apr. 8, 2005

(65) Prior Publication Data

US 2006/0227380 A1    Oct. 12, 2006

(51) Int. Cl.  
 *G06K 15/00* (2006.01)
(52) U.S. Cl. ............... 358/3.06; 358/3.01; 358/3.03; 358/3.05; 358/1.9; 358/518
(58) Field of Classification Search .......... 358/3.03, 358/3.06  
See application file for complete search history.

(56) References Cited

U.S. PATENT DOCUMENTS

| | | | | |
|---|---|---|---|---|
| 5,210,602 | A * | 5/1993 | Mintzer | 358/518 |
| 5,375,002 | A * | 12/1994 | Kim et al. | 358/521 |
| 5,565,994 | A | 10/1996 | Eschbach | |
| 5,631,748 | A * | 5/1997 | Harrington | 358/502 |
| 5,708,728 | A * | 1/1998 | Nomura | 382/162 |
| 6,014,233 | A | 1/2000 | Fan et al. | |
| 6,535,635 | B1 | 3/2003 | Klassen et al. | |
| 6,760,127 | B1 | 7/2004 | Shin et al. | |
| 6,844,941 | B1 | 1/2005 | Sharma et al. | |
| 7,199,905 | B2 * | 4/2007 | Sharma | 358/3.04 |
| 2003/0133160 | A1 * | 7/2003 | Sharma et al. | 358/3.06 |
| 2004/0100646 | A1 * | 5/2004 | Quintana | 358/1.9 |
| 2005/0195437 | A1 * | 9/2005 | Couwenhoven et al. | 358/3.03 |
| 2006/0197988 | A1 * | 9/2006 | Fan | 358/3.05 |

FOREIGN PATENT DOCUMENTS

| | | | |
|---|---|---|---|
| EP | 1318664 A2 | * | 6/2003 |
| EP | 1684498 A2 | * | 7/2006 |
| EP | 1699225 A1 | * | 9/2006 |

OTHER PUBLICATIONS

I. Katsavounidis, Y. Lin, C.-C. Jay Kuo, Multiscale error-diffusion digital halftoning with local intensity quality measure, 1994, Proc. SPIE 2298, pp. 224-234.*  
L. Velho, J. Gomes, M. Sobreiro, Color image quantization by pairwise clustering, 1997, IEEE, pp. 203-210.*  
Damera-Venkata et al., "Color Error Diffusion Halftoning," IEEE Signal Processing Magazine, vol. 20, No. 4, pp. 51-58 (Jul. 2003).  
Fan et al., "Improved quantization methods in color error diffusion," Journal of Electronic Imaging, vol. 8, No. 4, pp. 430-438 (Oct. 1999).

* cited by examiner

*Primary Examiner* — Chan S Park  
*Assistant Examiner* — Miya J Cato  
(74) *Attorney, Agent, or Firm* — Miele Law Group PC

(57) ABSTRACT

Halftoning is performed on a source image. The halftoning includes error diffusion processing of one separation based on error diffusion processing of another separation. The error diffusion processing includes determining a rendered pixel value for the one separation by applying a quantization function for a given pixel. The quantization function is based on both a modified input determined as a function of an error value of a pre-rendered pixel for the one separation and an error value determined as a function of rendered pixel values for the another separation. A rendered image is output, which includes the same plural color separations. The output rendered image is populated with, for the one separation, a rendered pixel value based on the application of the quantization function.

20 Claims, 4 Drawing Sheets

COLOR ERROR DIFFUSION

BACKGROUND

Aspects of the disclosure relate to methods of halftoning continuous tone images. Other aspects relate to error diffusion methods for color halftoning.

A given image may comprise a pattern (e.g., an array) of pixels. Each pixel corresponds to a defined location in the image (e.g., a grid cell), and comprises tone information. Tone information for a given point (e.g., corresponding to a pixel) or region of an image generally comprises a color component (related to one or more frequencies of visible light) and an intensity component (related to a radiant intensity of the pixel).

In a color image, by way of example, a given pixel may have tone information defined in terms of three-color values—R for red, G for green, and B for blue. In simplified terms, the magnitude of each of these values represents the intensity of the individual color at the pixel's location. In a grayscale image, a pixel generally has only one color value—gray, and its magnitude is representative of the shade of gray (generally related to the intensity of that color) in the pixel.

Halftoning involves taking a source image (which may be referred to as a "continuous-tone image"), which contains a certain amount of tone information, and converting it to a target image with less tone information.

Grayscale halftoning may involve in some implementations, e.g., converting a continuous-tone grayscale image (e.g., with each pixel having an 8 bit gray value—and therefore defined in terms of one of among 256 different shades of gray) to a halftoned grayscale image (e.g., with each pixel having only a 1 bit gray value—and therefore defined in terms of one of two different shades of gray (typically black or white)). Color halftoning may involve, e.g., converting a continuous-tone color image (e.g., a CMYK image with each pixel having C (cyan), M (magenta), Y (yellow), and B (black) values each comprising 8 bits) to a halftoned color image (e.g., a CMYK image with each pixel having CMYK values each comprising only one bit).

In digital color halftoning, the rendering device may be binary in nature, which means that for every available color of ink, it produces either a dot or pixel or no dot or pixel at any given location. Several digital halftoning methods exist, including error diffusion. An error diffusion method may include determining a quantization error for a given pixel based on intensity values of the pixel in the original image and based on weighted error values of certain neighbor pixels. The error values are then fed back, possibly filtered by an error filter, and added to the input continuous-tone image. This causes the quantization error frequencies and colors to be diffused in the output halftoned image.

Two types of error diffusion for digital color halftoning include scalar error diffusion and vector error diffusion. Both process images with multiple color layers (often referred to as separations). In scalar error diffusion, each color separation is halftoned independently, while in vector error diffusion, the color components are processed jointly.

SUMMARY

One embodiment is directed to a method for halftoning a source image. The halftoning includes error diffusion processing of one separation based on error diffusion processing of another separation. The error diffusion processing includes determining a rendered pixel value for the one separation by applying a quantization function for a given pixel. The quantization function is based on both a modified input determined as a function of an error value of a pre-rendered pixel for the one separation and an error value determined as a function of rendered pixel values for the another separation. A rendered image is output, which includes the same plural color separations. The output rendered image is populated with, for the one separation, a rendered pixel value based on the application of the quantization function.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
FIG. 1 is a schematic illustration of an image that may be processed using methods according to embodiments of the invention.

FIG. 1 is a schematic illustration of an image 10 to be processed. The illustrated image 10 represents a continuous tone image. For purposes of this description, a continuous tone image may be considered to be any image having more tone information than can be reproduced by a given rendering unit. Image 10 may be a continuous tone image of any type or origin, including a photographic image, a digital image, or an image created in one medium and then digitized. Additionally, image 10 need not be a picture; instead, image 10 may comprise any combination of text and graphic matter.

Image 10 may be halftoned by different types of rendering devices, e.g., including printers of various types, office document processing systems and general computing systems. The halftoned image may be ultimately presented or displayed in a printed document, on a computer monitor, or on another device with a limited number of available colors.

Figure 2:
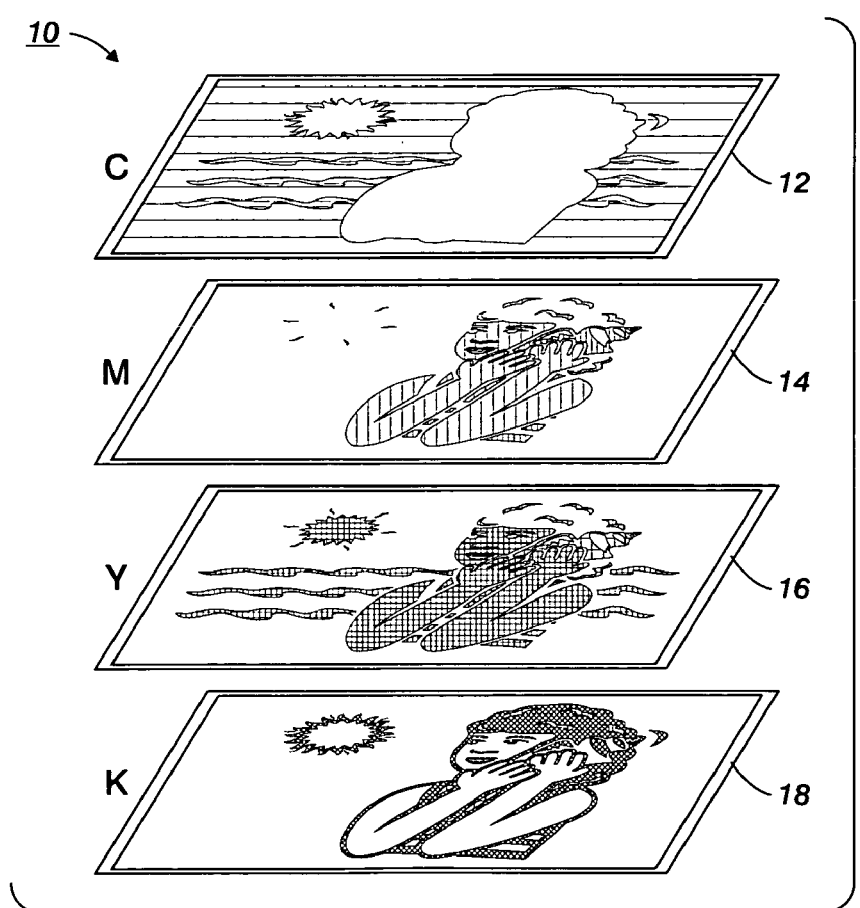
FIG. 2 is a schematic illustration of the image of FIG. 1 as represented by four color layers or separations in a CMYK color halftoning scheme.

In halftoning a continuous tone image, such as image 10, the rendering device may display the target image with a discrete set of color layers (called separations) that, when combined, are perceived by the human eye as conveying the range of tone information present in the source image. FIG. 2 shows an exemplary set of color separations for image 10 using cyan, magenta, yellow, and black (CMYK). Other color schemes (otherwise called color spaces) may be used. As shown in FIG. 2, image 10, in the CMYK scheme, may comprise a cyan separation 12, a magenta separation 14, a yellow separation 16, and a black separation 18. An image is rendered when it is stored, represented, or output in a form compatible for display or printing, or when the image is displayed or printed.

Figure 3:
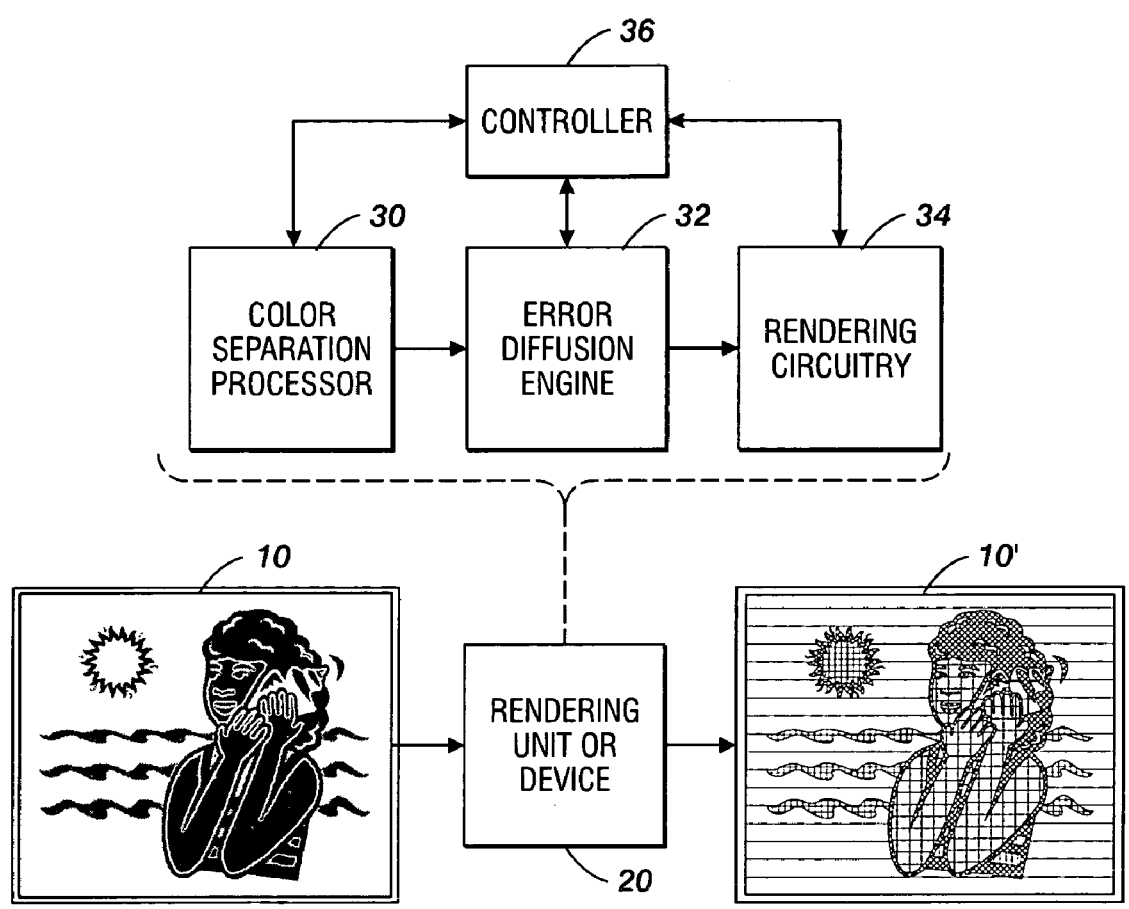
FIG. 3 is a schematic illustration of a process of halftoning the image of FIG. 1 using an error diffusion halftoning method according to one embodiment of the invention.

As illustrated in the schematic view of FIG. 3, an image, such as image 10, may be processed by a rendering unit or device 20, to create a halftoned image 10'. The rendering unit 20 may be any of the devices described above. Additionally, the term "rendering unit" may be construed to cover that portion of a larger device, such as a multifunction document processing system, which performs the halftoning operations.

As shown in FIG. 3, the illustrated unit or device 20 may comprise a number of elements to facilitate halftoning in accordance with the methods described herein. Specifically, as shown in FIG. 3, the illustrated unit or device 20 comprises, among other elements not shown in FIG. 3 or discussed herein, a color separation processor 30, an error diffusion engine 32, rendering circuitry 34, and a controller 36. Color separation processor separates a source image having a given color scheme into color separations of a different color scheme. Error diffusion engine performs error diffusion processing on the color separations. Controller 36 controls error diffusion engine 30 to halftone a source image. The halftoning comprises error diffusion processing of one separation based on error diffusion of another separation. The error diffusion processing includes determining a rendered pixel value for the one separation by applying a quantization function for a given pixel. The quantization function is based on both a modified input determined as a function of an error value of a pre-rendered pixel for the one separation and an error value determined as a function of rendered pixel values for the another separation.

Rendering circuitry 34 outputs a rendered image comprising the same plural color separations. The output rendered image is populated with, for the one separation, a rendered pixel value based on the application of the quantization function.

Figure 4:
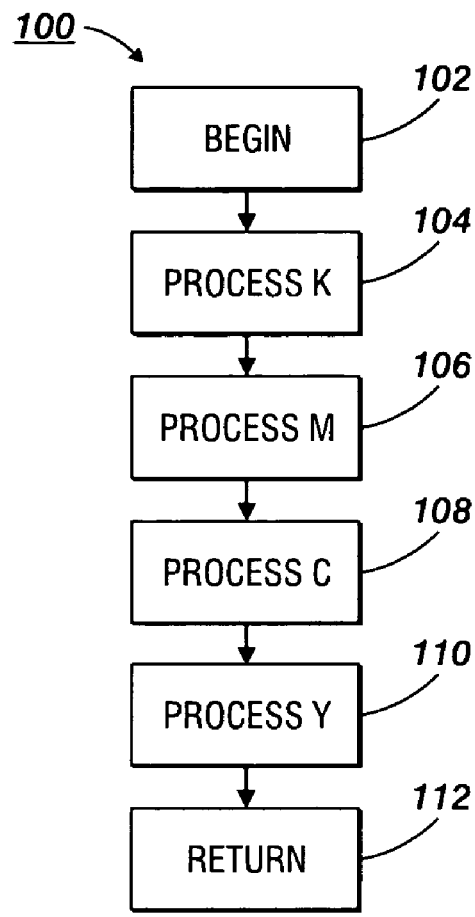
FIG. 4 is a high-level flow diagram showing, for the illustrated embodiment, an order in which the color separations are processed.

In operation of the illustrated device or unit, a source image is halftoned, and a rendered (target) image is then output. In halftoning the source image, error diffusion processing is performed on one separation of a plurality of color separations. As shown in FIG. 4, and as more fully described below, the set of separations may comprise C, M, Y, and K, and each separation in the pre-rendered image may be processed. Specifically, the separations may be processed in a given sequential order.

The error diffusion processing of one separation of a plurality of separations comprises, for respective pixels of the one separation, selecting as active or inactive the respective pixel location based on a comparison of a quantization modified input value with a threshold. When the one separation at a given image pixel is selected as active, a dot may be displayed or printed in the color of the one separation at the location within the rendered image corresponding to the given pixel.

The error diffusion processing may be performed on each of the plural separations in a given sequential order. In addition, outputting of the rendered image may comprise, for each output color separation, selecting image dots or pixels as active if a quantization modified input value for the image dot or pixel is greater than a particular threshold constant. Otherwise, image dots or pixels may be selected as inactive.

An example implementation of this process is shown in more detail in FIG. 6, described below.

Figure 6:
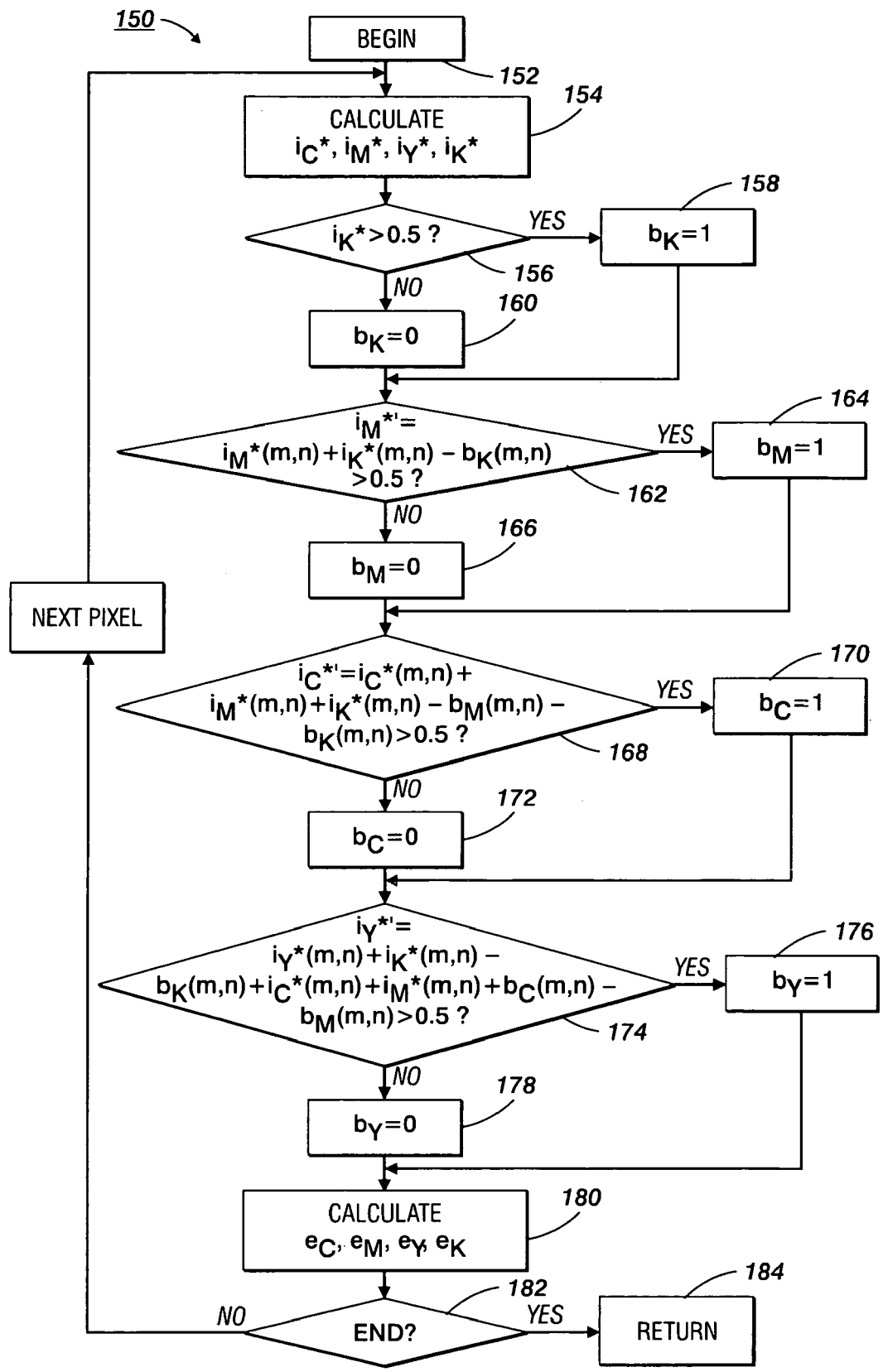
FIG. 6 is a flow diagram showing an exemplary method of processing given color separations in accordance with the illustrated embodiment.

In the embodiment shown in FIG. 4 and FIG. 6, the color separations 12, 14, 16, 18 of image 10 are processed in order from greatest to least visual impact, taking into account the errors from previously processed separations.

FIG. 4 is a high-level schematic flow diagram illustrating a method 100 for halftoning the image of FIG. 1. In particular, method 100 illustrates an order in which the color separations are processed. Image 10 contains a discrete number of pixels, and that image 10 has been separated so that it is represented by color separations 12, 14, 16, 18.

In method 100, the color separations 12, 14, 16, 18 of image 10 are processed in order according to their degree of visual impact on the perception of the overall image. Thus, the order in which they are processed may be set in accordance with the range and response characteristics of the human visual system. For example, in the CMYK color space, for example, the black (K) separation may be processed first, followed by that of the next most visually affecting color, magenta (M). Specifically, method 100 begins at act 102 and continues with act 104, in which the black separation 18 is processed. Following act 104, the magenta separation 14 is processed at act 106, the cyan separation 12 is processed at act 108, and the yellow separation 16, which has the least overall effect on the perception of the image, is processed last at act 110 before method 100 completes and returns at act 112. Although a particular processing order is specifically illustrated in method 100 of FIG. 4, other orders of processing may be used. For example, it may be determined that in a particular rendering operation, cyan is more visually affecting than magenta and should thus be processed first.

Figure 5:
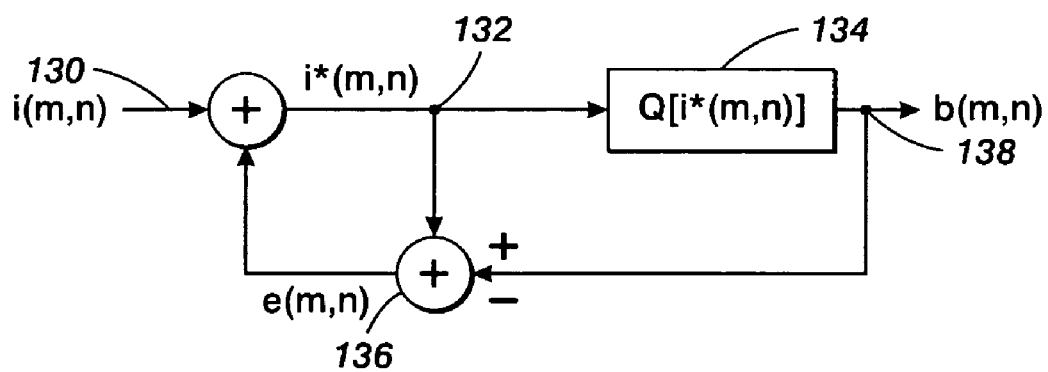
FIG. 5 is a schematic diagram of a color error diffusion halftoning process.

FIG. 5 is a schematic diagram of a color error diffusion halftoning process. In FIG. 5, each signal 130, 132, 134, 136, 138 is vector valued (e.g. a vector of RGB values). Input vector i(m, n) 130 is modified based on a quantization error e(m,n) 136 to produce a modified input i*(m,n) 132. Quantization error e(m,n) 136 is a function of modified input i*(m,n) 132 and output vector b(m, n) 138. Quantization error e(m,n) 136 is fed back and added to the input vector i(m, n) 130. The net effect is to diffuse the quantization error e(m,n) 136 frequencies and colors from output vector b(m, n) 138. Output vector b(m, n) 138 is determined by applying a quantization function Q[i*(m,n)] 134.

Error diffusion may be performed using the following equations:

$$i^*(m,n) = i(m,n) + \Sigma_{s,t} e(m-s, n-t) a(s,t) \quad (1)$$

$$b(m,n) = Q[i^*(m,n)] \quad (2)$$

$$e(m,n) = i^*(m,n) - b(m,n), \quad (3)$$

In the above set of equations: i(m,n) and b(m,n) are input and output vectors for the pixel located at coordinates (m,n); i*(m,n) and e(m,n) are modified input and quantization error; a(s, t) represents the error diffusion coefficients toward direction (s,t); and Q[.] represents a quantization operation. Equation (1) generates a modified input as the sum of the original input and any error diffused from other pixels to the input pixel. Equation (2) quantizes the modified input to produce the binary output. Equation (3) is a calculation of the error.

In the illustrated embodiment, b, the output vector for any particular pixel in the image, is calculated based upon the error made in quantizing the same pixel in previously processed separations. Specifically, b in the illustrated embodiment may be calculated using the following Equations for respective color separations (e.g. the C, M, Y, K color separations for a CMYK printer):

$$b_K(m,n) = 1, \text{ if } i_K^*(m,n) > 0.5; 0, \text{ otherwise}; \quad (4)$$

$$b_M(m,n) = 1, \text{ if } i_M^{*\prime} = i_M^*(m,n) + i_K^*(m,n) - b_K(m,n) > 0.5; \\ 0, \text{ otherwise}; \quad (5)$$

$$b_C(m,n) = 1, \text{ if } i_C^{*\prime} = i_C^*(m,n) + i_M^*(m,n) + i_K^*(m,n) - b_M(m,n) - b_K(m,n) > 0.5; \text{ or } 1, \text{ if } i_C^{*\prime} = i_C^*(m,n) + i_M^*(m,n) + i_K^*(m,n) - b_M(m,n) - b_K(m,n) > 0.5 - i_K(m,n) \\ \text{ and } b_M(m,n) = 1 \text{ and } b_K(m,n) = 0; 0, \text{ otherwise}; \quad (6)$$

$$b_Y(m,n)=1, \text{ if } i_Y^{*\prime}=i_Y^*(m,n)+i_K^*(m,n)-b_K(m,n)+[i_C^*(m,n)+i_M^*(m,n)+b_C(m,n)-b_M(m,n)]>0.5; 0, \text{ otherwise}; \quad (7)$$

In each of the above equations, the threshold value is shown as a fixed number of 0.5. However, the threshold may be a function of input values or other parameters.

Equation (4) shows the arithmetic for calculating K output vector. As illustrated by Equation (4), K output vector is processed using single color binary error diffusion. Single color error diffusion processing of K separation includes determining a rendered pixel value for the K separation by applying a quantization function for a given pixel. The quantization function is a comparison of the K separation modified input with a threshold to produce a binary output. The act of performing Equation (4) ensures maximum uniformity of K separation within the limitation of the error diffusion algorithm.

Equation (5) shows the arithmetic for calculating M output vector. M output vector is processed by calculating M separation based on error diffusion processing of another separation (e.g. K separation). M separation processing includes determining a rendered pixel value for the M separation by applying a quantization function for a given pixel. The quantization function is based on both a modified input determined as a function of an error value of a pre-rendered pixel for the M separation and an error value determined as a function of rendered pixel values for the another separation. (e.g. K separation). The quantization function includes comparing the M separation quantization modified input value with a threshold to produce a binary output. One skilled in the art will recognize that this act is the equivalent of first running a single color 3-output error diffusion using the sum of K and M as the input, and then producing $b_M(m, n)$ by deducting the K output. An ink overlap will occur when the sum of K and M inputs is greater than 1.

Similarly, Equation (6) shows the arithmetic for calculating C output vector. C output vector is determined by C separation based on error diffusion processing of other separations (i.e. K separation and M separation). C separation processing includes determining a rendered pixel value for the C separation by applying a quantization function for a given pixel. The quantization function is based on both a modified input determined as a function of an error value of a pre-rendered pixel for the C separation and an error value determined as a function of rendered pixel values for the another separation. (i.e. K separation and M separation). The quantization function includes comparing the C separation quantization modified input value with a threshold to produce a binary output. The act of performing the arithmetic of Equation (6) ensures maximum blue ink dispersion.

Equation (7) shows the arithmetic for calculating Y output vector. Y output vector is determined by Y separation based on error diffusion processing of other separations (i.e. K separation, M separation, and C separation). Y separation processing includes determining a rendered pixel value for the Y separation by applying a quantization function for a given pixel. The quantization function is based on both a modified input determined as a function of an error value of a pre-rendered pixel for the Y separation and an error value determined as a function of rendered pixel values for the another separation. (i.e. K separation, M separation, and C separation). The quantization function includes comparing the Y separation quantization modified input value with a threshold to produce a binary output.

FIG. 6 is a flow diagram illustrating a method, generally indicated at 150, of error diffusion by successive filling of the color separations 12, 14, 16, 18, as indicated in method 100 of FIG. 4. Method 150 is performed for each pixel in each separation, and begins at act 152. At act 154, $i_C^*, i_M^*, i_Y^*, i_K^*$ for the pixel is calculated, and control passes to act 156. At act 156, it is decided whether $i_K^*$ is greater than a threshold, that is whether $i_K^*$ is greater then 0.5. If $i_K^*$ is greater then the threshold (act 156: YES), $b_K$ is set equal to one at act 158; otherwise (act 156: NO) $b_K$ is set to zero.

Following act 158 or act 160, the control passes to act 162. At act 162, it is decided whether $i_M^{*\prime}$ is greater then the threshold, that is whether $i_M^{*\prime}$ is greater then 0.5. If $i_M^*$ is greater then the threshold (act 162: YES), $b_M$ is set equal to one at act 164; otherwise (act 162: NO) $b_M$ is set to zero.

Following act 164 or act 166, the control passes to act 168. At act 168, it is decided whether $i_C^{*\prime}$ is greater then the threshold, that is whether $i_C^{*\prime}$ is greater then 0.5. If $i_C^{*\prime}$ is greater then the threshold (act 168: YES), $b_C$ is set equal to one at act 170; otherwise (act 168: NO) $b_C$ is set to zero.

Following act 170 or act 172, the control passes to act 174. At act 174, it is decided whether $i_Y^{*\prime}$ is greater then the threshold, that is whether $i_Y^{*\prime}$ is greater then 0.5. If $i_Y^{*\prime}$ is greater then the threshold (act 174: YES), by is set equal to one at act 176; otherwise (act 174: NO) $b_Y$ is set to zero.

Following act 176 or act 178, the error component is calculated for each color separation at act 180, and control passes to act 182. At act 182, if all the pixels have been processed (act 182: YES), method 150 terminates and returns to act 184. If all the pixels have not been processed (act 182: NO), control method 150 returns to act 154, and method 150 continues for the next pixel.

The error diffusion half-toning methods 100, 150 described herein may be implemented in hardware components, in software, or in some mix of hardware and software. For example, if the rendering device 20 used to implement the methods has a general purpose microprocessor, the acts of methods 100, 150, or other similar methods, may be encoded in a set of processor instructions that is stored in an appropriate machine or computer readable medium, be it a magnetic storage medium, an optical storage medium, random access memory, read only memory, flash memory, or any other form of machine or computer readable medium. Additionally or alternatively, the tasks involved in methods 100, 150 and other similar methods may be encoded in or with a special purpose microprocessor, an ASIC, or another type of computing device or set of devices adapted to perform the tasks of the methods. The tasks of the methods 100, 150 may be coded in any programming language that is capable of executing them and that is compatible with the rendering system that is to be used.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. Apparatus comprising:
   a color separation processor to separate a source image having a given color scheme into plural color separations of a different color scheme, the plural color separations including at least one separation corresponding to one color component and another separation corresponding to another color component different than the one color component;
   an error diffusion engine;
   a controller to control the error diffusion engine to carry out error diffusion processing on the one separation based on error diffusion processing on the another separation, the error diffusion processing on the one separation including determining, for the one separation, a given rendered pixel value of the one separation and corresponding to a given pixel location, the given rendered pixel value being determined by applying a quantization function to a pre-rendered pixel value of the one separation and corresponding to the given pixel location, the quantization function, when applied, performing mathematical operations on each of (i) a modified input pixel value of the one separation and corresponding to the given pixel location, the modified input pixel value being determined as a function of an error value of a pre-rendered pixel value of the one separation, and (ii) another error value, the another error value being determined as a function of rendered pixel values of the another separation; and rendering circuitry to output a rendered image including the same plural color separations, the output rendered image being populated with, for the one separation, the rendered pixel value determined by applying the quantization function.

2. The apparatus of claim 1, wherein the rendered pixel value represents a selection of an image pixel in the rendered image as active or inactive for the one separation.

3. The apparatus of claim 2, wherein when the one separation at a given image pixel is selected as active, a dot is displayed or printed in the color of the one separation at the location within the rendered image corresponding to the given pixel.

4. The apparatus of claim 3, further comprising a rendering unit to print or display the output produced by the rendering circuitry.

5. The apparatus of claim 4, wherein the apparatus comprises at least one of a document processing system, a printer, and a computer.

6. The apparatus of claim 5, wherein the quantization function includes, for the color separations, for each pixel or dot within the color separations, providing a "1" when a quantization modified input value is greater than 0.5.

7. A method comprising:

halftoning a source image, the halftoning including error diffusion processing on one separation based on error diffusion processing on another separation, the error diffusion processing including determining, for the one separation, a given rendered pixel value of the one separation and corresponding to a given pixel location, the given rendered pixel value being determined by applying a quantization function to a pre-rendered pixel value of the one separation and corresponding to the given pixel location, the quantization function, when applied, performing mathematical operations on each of (i) a modified input pixel value of the one separation and corresponding to the given pixel location, the modified input pixel value being determined as a function of an error value of a pre-rendered pixel value of the one separation, and (ii) another error value, the another error value being determined as a function of rendered pixel values of the another separation; and outputting a rendered image including the same plural color separations, the output rendered image being populated with, for the one separation, the rendered pixel value based on the application of the quantization function.

8. The method of claim 7, wherein the pixel information represents a selection of an image pixel in the rendering image as active or inactive for the one separation.

9. The method of claim 8, wherein when the one separation at a given image pixel is selected as active, a dot is displayed or printed in the color of the one separation at the location within the rendered image corresponding to the given pixel.

10. The method of claim 9, comprising performing error diffusion processing on each of the plural color separations in a given sequential order, and wherein the outputting of the rendered image comprises, for each output color separation, selecting image dots or pixels as active if a quantization modified input value for the image dot or pixel is greater than a threshold, and selecting image dots or pixels as inactive otherwise.

11. The method of claim 10, further comprising:
printing or displaying the output for each color separation to produce a halftoned image.

12. The method of claim 11, wherein the color separations are cyan, magenta, yellow, and black, and wherein the given sequential order is black, magenta, cyan, and yellow.

13. The method of claim 12, wherein the outputting of the rendered image includes outputting, for each color separation, for each pixel or dot within a given color separation, a "1" when a quantization modified input value for the same pixel or dot is greater then 0.5.

14. The method of claim 13, further comprising, before the halftoning, separating the source image having a given color scheme into the color separations of a different color scheme.

15. The method of claim 7, wherein the one separation is a magenta (M) separation and the another separation is a black (K) separation.

16. The method of claim 15, wherein the black (K) separation is processed before the magenta (M) separation, and a black (K) separation processing applies a quantization function for a given pixel based on an error value determined as a function of pre-rendered pixel values for the black separation.

17. A non-transitory machine-readable medium comprising encoded information, the encoded information, when operably interacting with the machine, causing:

halftoning a source image, the halftoning including error diffusion processing on one separation based on error diffusion processing on another separation, the error diffusion processing including determining, for the one separation, a given rendered pixel value of the one separation and corresponding to a given pixel location, the given rendered pixel value being determined by applying a quantization function to a pre-rendered pixel value of the one separation and corresponding to the given pixel location, the quantization function, when applied, performing mathematical operations on each of (i) a modified input pixel value of the one separation and corresponding to the given pixel location, the modified input pixel value being determined as a function of an error value of a pre-rendered pixel value of the one separation, and (ii) another error value, the another error value being determined as a function of rendered pixel values of the another separation; and outputting a rendered image including the same plural color separations, the output rendered image being populated with, for the one separation, the rendered pixel value based on the application of the quantization function.

18. The machine-readable medium of claim 17, wherein the rendered pixel value represents a selection of an image pixel in the rendered image as active or inactive for the one separation.

19. The machine-readable medium of claim 18, wherein when the one separation at a given image pixel is selected as active, a dot is displayed or printed in the color of the one separation at the location within the rendered image corresponding to the given pixel.

20. The machine-readable medium of claim 19, wherein the encoded information, when operably interacting with the machine, causes error diffusion processing on each of the plural color separations in a given sequential order.

* * * * *